United States Patent
Kumar et al.

(10) Patent No.: US 12,429,416 B2
(45) Date of Patent: Sep. 30, 2025

(54) POLARIMETRIC CHARACTERIZATION OF TRANSPARENT OBJECTS

(71) Applicant: Tata Consultancy Services Limited, Mumbai (IN)

(72) Inventors: Achanna Anil Kumar, Bangalore (IN); Tapas Chakravarty, Kolkata (IN); Subhasri Chatterjee, Kolkata (IN); Arpan Pal, Kolkata (IN); Jayavardhana Rama Gubbi Lakshminarasimha, Bangalore (IN); Rokkam Krishna Kanth, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 461 days.

(21) Appl. No.: 18/066,374

(22) Filed: Dec. 15, 2022

(65) Prior Publication Data
US 2023/0204494 A1 Jun. 29, 2023

(30) Foreign Application Priority Data
Dec. 28, 2021 (IN) .............................. 202121061180

(51) Int. Cl.
*G01N 21/23* (2006.01)
*G01J 4/04* (2006.01)
*G01N 21/958* (2006.01)

(52) U.S. Cl.
CPC ................ *G01N 21/23* (2013.01); *G01J 4/04* (2013.01); *G01N 21/958* (2013.01)

(58) Field of Classification Search
CPC ...... G01N 21/23; G01N 21/958; G01N 21/21; G01N 2021/217; G01J 4/04
See application file for complete search history.

(56) References Cited

U.S. PATENT DOCUMENTS

| | | | | |
|---|---|---|---|---|
| 4,309,110 A | * | 1/1982 | Tumerman | G01N 21/21 356/365 |
| 5,045,701 A | * | 9/1991 | Goldstein | G01J 3/447 250/353 |

(Continued)

FOREIGN PATENT DOCUMENTS

| | | | | |
|---|---|---|---|---|
| CN | 111413282 A | | 7/2020 | |
| CN | 119044245 A | * | 11/2024 | ............. G01N 21/21 |

(Continued)

OTHER PUBLICATIONS

Guadalupe Lopez-Morales et al., "Mueller Matrix Polarimetric Imaging Analysis of Optical Components for the Generation of Cylindrical Vector Beams," Crystals, Dec. 2020, vol. 10(12), MDPI, https://www.mdpi.com/2073-4352/10/12/1155.

*Primary Examiner* — Mohamed K Amara
(74) *Attorney, Agent, or Firm* — Finnegan, Henderson, Farabow, Garrett & Dunner, LLP (57) ABSTRACT

Existing Mueller Matrix polarization techniques that rely only on polarization properties are insufficient for accurate characterization of transparent objects. Embodiments of the present disclosure provide a method and system for Mueller Matrix polarimetric characterization of transparent object using optical properties along with the polarization properties to accurately characterize the transparent object. The polarization properties of are derived from a decomposed Mueller matrix element. Additionally, the method derives the optical properties by further subjecting the decomposed Mueller matrix element to Fresnel's law-based analysis and a reverse Monte Carlo analysis to extract optical properties such as a material refractive index and a material attenuation index. Optical properties vary with changes in the material property caused due to several factors such as manufacturing defect, aberration, inclusion of an impurity such as bubble or dust etc. Thus, considering the optical properties along with (Continued)

the polarization properties enables enhanced, accurate characterization of the transparent object.

6 Claims, 4 Drawing Sheets

(56) References Cited

U.S. PATENT DOCUMENTS

| | | | | |
|---|---|---|---|---|
| 6,118,536 A * | 9/2000 | Sakamoto | | G01N 21/19 |
| | | | | 356/364 |
| 6,639,674 B2 * | 10/2003 | Sokolov | | G01N 21/21 |
| | | | | 356/369 |
| 6,963,400 B1 * | 11/2005 | Videen | | G01N 21/21 |
| | | | | 356/438 |
| 7,808,637 B2 * | 10/2010 | Smith | | G02F 1/1309 |
| | | | | 356/367 |
| 8,040,511 B1 * | 10/2011 | Krishnan | | G01N 21/211 |
| | | | | 356/369 |
| 9,441,948 B2 * | 9/2016 | Vakoc | | G01B 9/02072 |
| 11,170,199 B1 * | 11/2021 | Ramella-Roman | | G06N 3/08 |
| 11,328,380 B2 * | 5/2022 | Pinter | | G06T 7/586 |
| 11,415,791 B1 * | 8/2022 | Park | | H04N 23/90 |
| 11,813,072 B2 * | 11/2023 | Vilenskii | | A61B 5/443 |
| 2004/0257567 A1 * | 12/2004 | Woollam | | G01N 21/211 |
| | | | | 356/369 |
| 2005/0264813 A1 * | 12/2005 | Giakos | | G01J 3/447 |
| | | | | 356/369 |
| 2007/0146632 A1 * | 6/2007 | Chipman | | G01J 4/04 |
| | | | | 351/205 |
| 2013/0308132 A1 * | 11/2013 | Giakos | | G01N 21/23 |
| | | | | 356/369 |
| 2014/0180655 A1 * | 6/2014 | Chipman | | G02B 27/0012 |
| | | | | 703/2 |
| 2016/0054217 A1 | 2/2016 | Hartrumpf | | |
| 2018/0052098 A1 * | 2/2018 | White | | G01N 21/274 |
| 2018/0156895 A1 * | 6/2018 | Hinderling | | G01S 17/42 |
| 2018/0164566 A1 * | 6/2018 | Chen | | G01N 21/21 |
| 2018/0188429 A1 * | 7/2018 | Pau | | G02F 1/133533 |
| 2018/0228415 A1 * | 8/2018 | Lo | | A61B 5/0066 |
| 2018/0252695 A1 * | 9/2018 | Huang | | G01N 21/4738 |
| 2018/0271430 A1 * | 9/2018 | Ramella-Roman | | A61B 5/435 |
| 2019/0018143 A1 * | 1/2019 | Thayer | | G01S 17/89 |
| 2020/0209602 A1 * | 7/2020 | Pau | | G01M 11/331 |
| 2020/0393238 A1 * | 12/2020 | Zhuang | | G01B 11/0641 |
| 2021/0396509 A1 * | 12/2021 | Bouma | | G02B 27/283 |
| 2022/0034791 A1 * | 2/2022 | Zhang | | G01N 21/8422 |
| 2022/0334371 A1 * | 10/2022 | Bokadia | | G02B 21/365 |
| 2024/0201072 A1 * | 6/2024 | Sakamoto | | G01N 21/21 |

FOREIGN PATENT DOCUMENTS

| | | |
|---|---|---|
| JP | 2022509360 A | 1/2022 |
| JP | 7103159 B2 | 7/2022 |
| WO | WO2021156356 A1 | 8/2021 |
| WO | WO-2022251159 A1 * | 12/2022 ............. G01N 21/21 |

* cited by examiner

```
┌─────────────────────────────────────────┐
│ receiving a plurality transformed       │
│ polarization states recorded by a       │──── 202
│ polarization camera for a transparent   │
│ object to be characterized              │
└─────────────────────────────────────────┘
                    ▼
┌─────────────────────────────────────────┐
│ estimating a plurality of Mueller       │
│ Matrix image elements by observing the  │
│ change in the plurality of transformed  │──── 204
│ polarization states while the polarized │
│ light propagates through the transparent│
│ object to form a Mueller Matrix         │
└─────────────────────────────────────────┘
                    ▼
┌─────────────────────────────────────────┐
│ computing a plurality of polarization   │
│ properties of the transparent object by │──── 206
│ decomposing the Mueller Matrix as       │
│ product of three elementary matrices    │
└─────────────────────────────────────────┘
                    ▼
┌─────────────────────────────────────────┐
│ computing a plurality of optical        │
│ properties, of the transparent object   │
│ from the decomposed Mueller Matrix, the │
│ optical properties comprising (a) a     │
│ material refractive index (n)           │
│ determined from a first element of the  │──── 208
│ Mueller Matrix M(1,1) using Fresnel's   │
│ law-based analysis, which represents a  │
│ total intensity of the polarization     │
│ light; and (b) a material attenuation   │
│ index determined by processing the first│
│ element M(1,1) using a reverse Monte    │
│ Carlo technique                         │
└─────────────────────────────────────────┘
                    ▼
┌─────────────────────────────────────────┐
│ characterizing the transparent object   │
│ via an Artificial Intelligence (AI)     │
│ model during inferencing stage, wherein │
│ the characterizing of the transparent   │──── 210
│ object is based on the computed         │
│ plurality of polarization properties and│
│ the computed plurality of optical       │
│ properties                              │
└─────────────────────────────────────────┘
```

POLARIMETRIC CHARACTERIZATION OF TRANSPARENT OBJECTS

PRIORITY CLAIM

This U.S. patent application claims priority under 35 U.S.C. § 119 to: Indian Provisional Patent Application No. 202121061180, filed on Dec. 28, 2021. The entire contents of the aforementioned application are incorporated herein by reference.

TECHNICAL FIELD

The disclosure herein generally relates to the field of characterization of transparent objects, and, more particularly, to a method and system for Mueller Matrix polarimetric characterization of transparent objects based on polarization properties and optical properties.

BACKGROUND

Objects made from transparent materials, such as glass and clear fiber, are commonly referred as transparent objects. These transparent objects, such as glass panels, lenses, fluorescent light bulbs, reflective surfaces are quite useful in everyday life. Further the transparent objects are extremely crucial in a wide range of scientific and manufacturing applications, and new ways to leverage them are being developed consistently. Various types of defects can occur during production of the transparent objects, which can adversely impact on its function and use. Defects or failures in products that appear during customer application are also undesirable because they spoil the products image. These defects are unacceptable because they have significant economic impact, as they reduce yield of manufacturing articles, resulting revenue loss. Hence it is important to identify any defects in the transparent objects. Characterization of the transparent objects is a process to identify and localize defects, such as manufacturing defect, aberration, inclusion of an impurity such as bubble or dust, thickness differences, and thereof in the transparent objects.

Existing techniques for the characterization of the transparent objects using simple intensity-based imaging techniques, such as RGB cameras is highly challenging. The characterization of the transparent object is performed by illuminating light on to the transparent object and further processing the reflected light from the transparent object. Properties of the reflected light captured by the RGB cameras are not significant enough to characterize the transparent objects. Besides this, the transparent objects are characterized using Mueller Matrix polarization techniques. When a polarization light passes through the transparent objects, the transparent objects polarization properties get effected. Furthermore, these polarization properties are used to characterize the transparent objects. However, the existing Mueller Matrix polarization techniques that rely only on the fundamental polarization properties are insufficient for characterizing the transparent objects.

SUMMARY

Embodiments of the present disclosure present technological improvements as solutions to one or more of the above-mentioned technical problems recognized by the inventors in conventional systems. For example, in one embodiment, a method for Mueller Matrix polarimetric characterization of transparent objects based on polarization properties and optical properties is provided. The method comprises receiving a plurality transformed polarization states for a transparent object to be characterized, wherein the plurality transformed polarization states are recorded by a polarization camera when a polarized light of a plurality of known polarization states is incident onto the transparent object. Further, the method comprises estimating a plurality of Mueller Matrix image elements by observing a change in the plurality of transformed polarization states while the polarized light propagates through the transparent object to form a Mueller Matrix. Furthermore, the method comprises computing a plurality of polarization properties of the transparent object by decomposing the Mueller Matrix as product of three elementary matrices comprising, a depolarizer ($M_\Delta$), a retarder ($M_R$), and a diattenuator ($M_D$), wherein the plurality of polarization properties comprising a diattenuation ($\delta$), a retardance (r), a depolarization ($\Delta$), and an optical birefringence ($\Delta N$). Furthermore, the method comprises computing a plurality of optical properties, of the transparent object from the decomposed Mueller Matrix, wherein the plurality of the optical properties comprise a material refractive index (n) and a material attenuation index ($\mu_\alpha$). The material refractive index (n) is determined from a first element of the Mueller Matrix M(1,1) using Fresnel's law-based analysis, which represents a total intensity of the polarization light; and the material attenuation index ($\mu_\alpha$) is determined by processing the first element M (1,1) representing the total intensity of the polarization light by using a reverse Monte Carlo technique. Further, the method comprises characterizing the transparent object via an Artificial Intelligence (AI) model executed by the one or more hardware processors, during inferencing stage, wherein the characterizing of the transparent object is based on the computed plurality of polarization properties and the computed plurality of optical properties, and wherein to the AI model is pretrained with gold standard polarization properties and gold standard optical properties of transparent objects.

In another aspect, a system for Mueller Matrix polarimetric characterization of transparent objects based on polarization properties and optical properties is provided. The system comprises a memory storing instructions; one or more Input/Output (I/O) interfaces; and one or more hardware processors coupled to the memory via the one or more I/O interfaces, wherein the one or more hardware processors are configured by the instructions receive a plurality transformed polarization states for a transparent object to be characterized, wherein the plurality transformed polarization states are recorded by a polarization camera when a polarized light of a plurality of known polarization states is incident onto the transparent object. Further, the one or more hardware processors are configured to estimate a plurality of Mueller Matrix image elements by observing a change in the plurality of transformed polarization states while the polarized light propagates through the transparent object to form a Mueller Matrix. Furthermore, the one or more hardware processors are configured to compute a plurality of polarization properties of the transparent object by decomposing the Mueller Matrix as product of three elementary matrices comprising, a depolarizer ($M_\Delta$), a retarder ($M_R$), and a diattenuator ($M_D$), wherein the plurality of polarization properties comprising a diattenuation ($\delta$), a retardance (r), a depolarization ($\Delta$), and an optical birefringence ($\Delta N$). Furthermore, the one or more hardware processors are configured to compute a plurality of optical properties, of the transparent object from the decomposed Mueller Matrix, wherein the plurality of the optical properties comprise a material refractive index (n) and a material attenuation index ($\mu_\alpha$). The material refractive index (n) is determined from a first element of the Mueller Matrix M(1,1) using Fresnel's law-based analysis, which represents a total intensity of the polarization light; and the material attenuation index ($\mu_\alpha$) is determined by processing the first element M (1,1) representing the total intensity of the polarization light by using a reverse Monte Carlo technique. Further, the one or more hardware processors are configured to characterize the transparent object via an Artificial Intelligence (AI) model executed by the one or more hardware processors, during inferencing stage, wherein the characterizing of the transparent object is based on the computed plurality of polarization properties and the computed plurality of optical properties, and wherein to the AI model is pretrained with gold standard polarization properties and gold standard optical properties of transparent objects.

In yet another aspect, there are provided one or more non-transitory machine-readable information storage mediums comprising one or more instructions, which when executed by one or more hardware processors causes a method for Mueller Matrix polarimetric characterization of transparent objects based on polarization properties and optical properties is provided. The method comprises receiving a plurality transformed polarization states for a transparent object to be characterized, wherein the plurality transformed polarization states are recorded by a polarization camera when a polarized light of a plurality of known polarization states is incident onto the transparent object. Further, the method comprises estimating a plurality of Mueller Matrix image elements by observing a change in the plurality of transformed polarization states while the polarized light propagates through the transparent object to form a Mueller Matrix. Furthermore, the method comprises computing a plurality of polarization properties of the transparent object by decomposing the Mueller Matrix as product of three elementary matrices comprising, a depolarizer ($M_\Delta$), a retarder ($M_R$), and a diattenuator ($M_D$), wherein the plurality of polarization properties comprising a diattenuation ($\delta$), a retardance (r), a depolarization ($\Delta$), and an optical birefringence ($\Delta N$). Furthermore, the method comprises computing a plurality of optical properties, of the transparent object from the decomposed Mueller Matrix, wherein the plurality of the optical properties comprise a material refractive index (n) and a material attenuation index ($\mu_\alpha$). The material refractive index (n) is determined from a first element of the Mueller Matrix M(1,1) using Fresnel's law-based analysis, which represents a total intensity of the polarization light; and the material attenuation index ($\mu_\alpha$) is determined by processing the first element M (1,1) representing the total intensity of the polarization light by using a reverse Monte Carlo technique. Further, the method comprises characterizing the transparent object via an Artificial Intelligence (AI) model executed by the one or more hardware processors, during inferencing stage, wherein the characterizing of the transparent object is based on the computed plurality of polarization properties and the computed plurality of optical properties, and wherein to the AI model is pretrained with gold standard polarization properties and gold standard optical properties of transparent objects.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Existing Mueller Matrix polarization techniques that rely only on the fundamental polarization properties are insufficient for accurate characterization of transparent objects. Polarization parameters give the orientation of the electric and magnetic field components which may not change with the defects in the transparent object such as density deformity, crystal structure defect etc. which additionally need optical analysis to accurately characterize the object with corresponding defects. The embodiments of the present disclosure provide a method and system for Mueller Matrix polarimetric characterization of a transparent object using optical properties along with the polarization properties to accurately characterize the transparent object. The polarization properties are derived from a decomposed Mueller matrix element, well known in the art. The polarization properties includes, a diattenuation ($\delta$), a retardance (r), a depolarization ($\Delta$), an optical birefringence ($\Delta n$). Additionally, the method derives the optical properties by further subjecting the decomposed Mueller matrix element to Fresnel's law-based analysis and a reverse Monte Carlo analysis to extract optical properties such as a material refractive index and a material attenuation index respectively. The material refractive index and the material attenuation index vary with changes in the material property caused due to several factors such as manufacturing defect, aberration, inclusion of an impurity such as bubble or dust etc. Attenuation index is an indicative of the attenuation of light while passing through the object. Defects present in the coating change the structural characteristics of the sample, causing the light to travel in different speed than normal. For example, if there is a crack present in the transparent object, there will be air present in that cracked region. In usual case, light would travel only through the object whereas in the cracked one, light also will travel through air. The speed of light is different in air and the sample object that would result in different attenuation of light. This attenuation is directly measured by the material attenuation index or coefficient by the method disclosed herein, reflecting the presence of the defect. Thus, considering the optical properties along with the polarization properties enables accurate characterization of the transparent object with enhance reliability in process on material characterization.

There are references in literature to derive refractive index from Mueller Matrix for material characterization, however, the method discloses a new approach to derive the material refractive index from Mueller Matrix. No other work has derived the refractive index directly from one of the Mueller matrix elements as in the method disclosed herein. Furthermore, use of the material attenuation index introduced by the method has not been identified in works in the art.

Further, the extracted polarization properties and the optical properties are further compared against an Artificial Intelligence (AI) model to get appropriate inferences of the transparent object, wherein the AI model is pretrained with gold standard polarization properties and gold standard optical properties (material refractive index and material attenuation index) of the transparent objects.

Referring now to the drawings, and more particularly to FIGS. 1A through 3, where similar reference characters denote corresponding features consistently throughout the figures, there are shown preferred embodiments and these embodiments are described in the context of the following exemplary system and/or method.

Figure 1A:
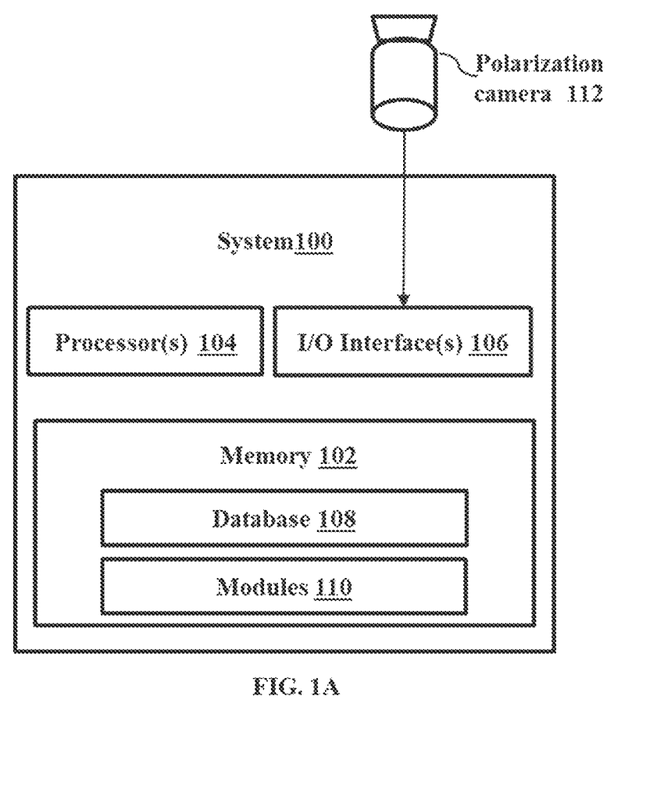
FIG. 1A is a functional block diagram of a system for Mueller Matrix polarimetric characterization of transparent objects, in accordance with some embodiments of the present disclosure.

FIG. 1A is a functional block diagram of a system 100 for Mueller Matrix polarimetric characterization of a transparent object, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, personal digital assistants and the like.

The I/O interface(s) 106 can include a variety of software and hardware interfaces, for example, a web interface, a graphical user interface and can facilitate multiple communications within a wide variety of networks N/W and protocol types such as the m-UDP, including wired networks, for example, LAN, cable, etc., and wireless networks, such as WLAN, cellular, or satellite. In an embodiment, the I/O interface (s) 106 can include one or more ports for connecting a polarization camera 112 (described in conjunction with FIG. 1B), a number of devices (nodes) such as to one another or to another server or devices.

Figure 1B:
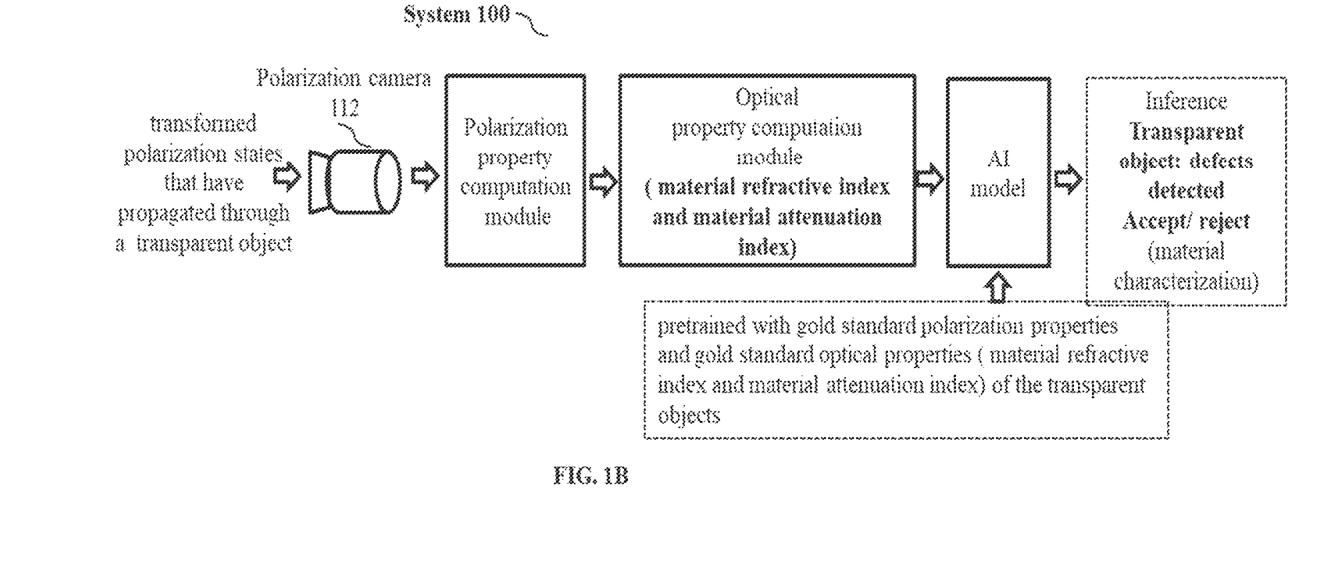
FIG. 1B is a process overview of the system of FIG. 1, in accordance with some embodiments of the present disclosure.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 110 that includes the AI model, a polarization property computation module, an optical property computation module and the like as depicted in FIG. 1B. Further, the plurality of modules 110 include programs or coded instructions that supplement applications or functions performed by the system 100 for executing different steps involved in the process of enhanced NER, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure. Further, the memory 102 includes a database 108. The database 108 may a plurality of transformed polarization states recorded by the polarization camera 112, and 16 Mueller Matrix image elements of a Mueller Matrix generated for each transparent object by observing change in the plurality of transformed polarization states (later explained in conjunction with FIGS. 1B and 2). The database (or repository) 108 may include a plurality of abstracted piece of code for refinement and data that is processed, received, or generated as a result of the execution of the plurality of modules in the module(s) 110.

Although the database 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagram in FIG. 2 and architectural or process overview of the system 100 depicted in FIG. 3.

FIG. 1B is a process overview of the system 100 of FIG. 1, in accordance with some embodiments of the present disclosure. As depicted in FIG. 3, which illustrates a setup for Mueller Matrix polarimetric characterization of transparent objects, a polarized light of a plurality of known polarization states using a polarized light source is incident onto the transparent object to be characterized. The complete setup is enclosed in a concealed chamber. The polarized light is passed through configurable Polarization State Generator (PSG). The PSG is a combination of a quarter wave plate and a linear polarizer. The quarter wave plate is used to control the polarization state of polarized light by transforming a linearly polarized light into a circularly polarized light. The quarter wave plate is physically designed to produce a phase difference of one-quarter of a wavelength. The linear polarizer is used as an optical filter that lets polarized light waves of a specific polarization state pass through while blocking light waves of other polarization states. By using the combination of the quarter waveplate and linear polarizer, 16 different polarization states of the polarized light are created. Such polarized light of plurality of known polarization states are incident onto the transparent object. The polarization camera 112, captures the 16 Mueller Matrix image elements of the Mueller Matrix generated as a result of the 16 different polarization states of the polarized light when they pass through the transparent object and a transparent glass as shown in FIG. 3. The polarization property computation module computes the polarization properties, also referred as fundamental properties and the optical property computation module computes the optical properties for the transparent object. The computed properties are then provided to the AI model for inference on quality and characteristics of the transparent object. The AI model is pretrained with (i) gold standard polarization properties (the diattenuation ($\delta$), the retardance (r), the depolarization ($\Delta$), and the optical birefringence ($\Delta$N)), and (ii) gold standard optical properties (material refractive index (n) and material attenuation index ($\mu_\alpha$)) of the transparent objects during an offline training phase. The optical properties and the polarization properties for transparent objects used during training phase are derived using the polarization property computation module and the optical property computation module in accordance with computation steps described in a method 200 of FIG. 2 below.

Figure 2:
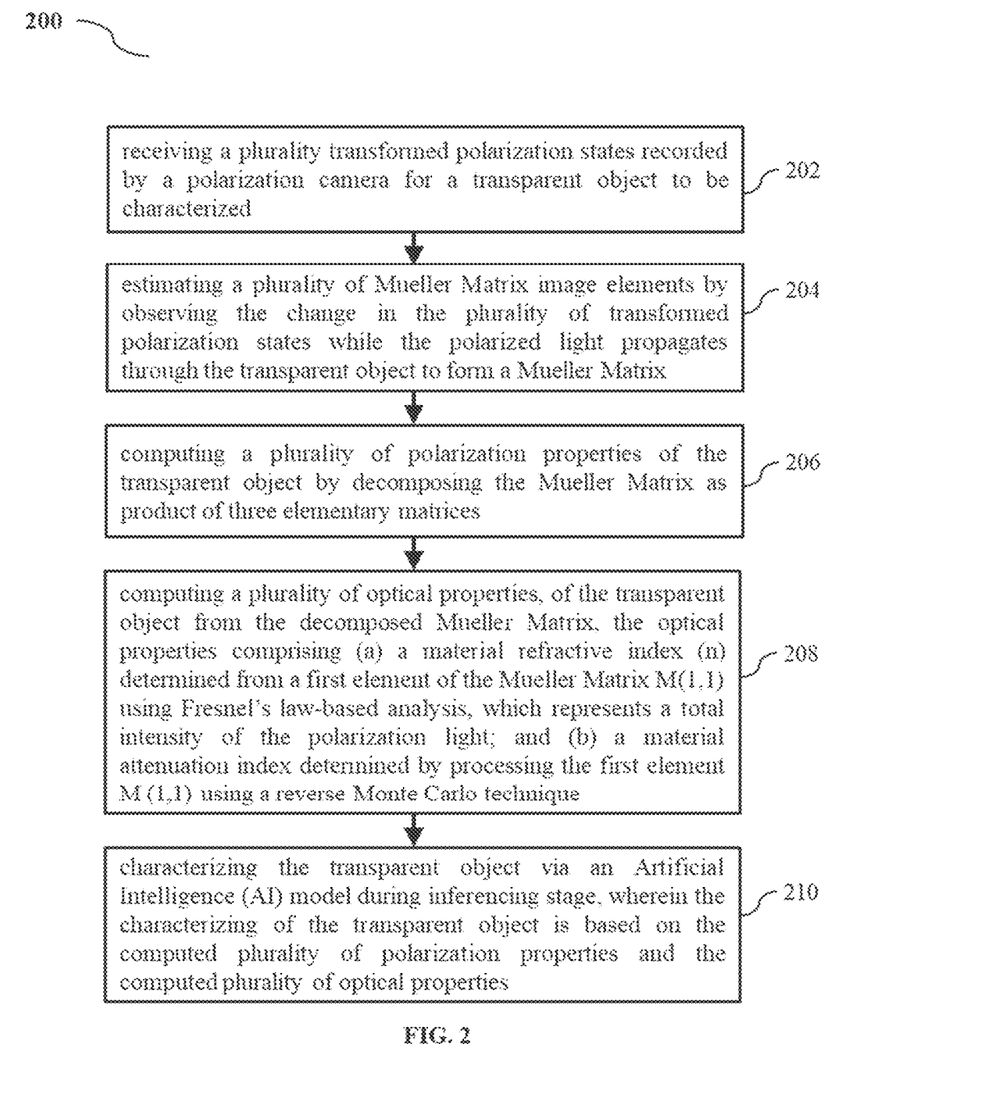
FIG. 2 is flow diagrams illustrating a method for Mueller Matrix polarimetric characterization of the transparent objects using the system of FIG. 1, in accordance with some embodiments of the present disclosure.
Figure 3:
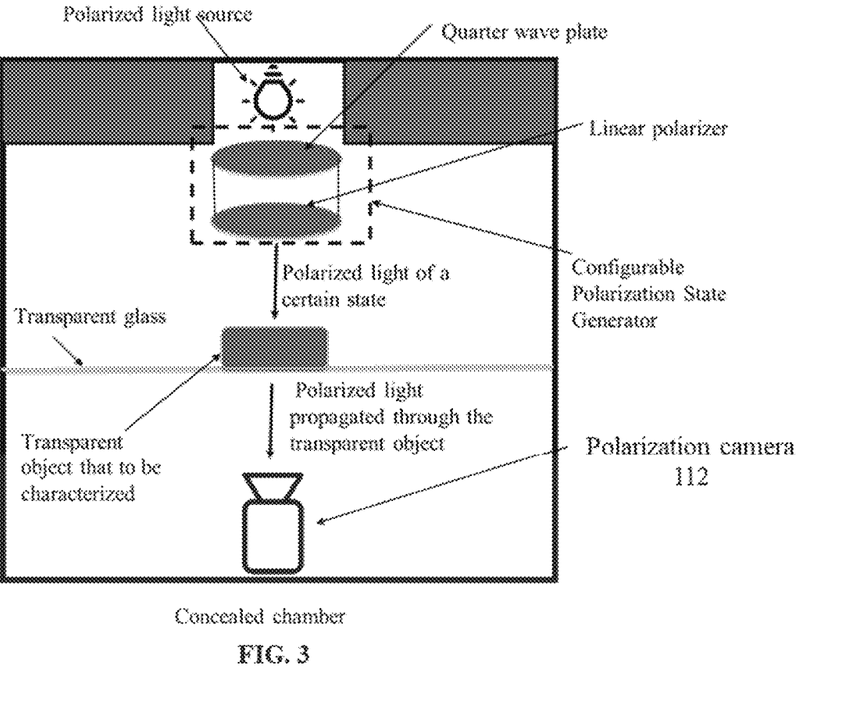
FIG. 3 is a block diagram illustrating a setup for Mueller Matrix polarimetric characterization of transparent objects, according to some embodiments of the present disclosure.

FIG. 2 is a flow diagrams illustrating a method 200 for Mueller Matrix polarimetric characterization of the transparent object using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202, the one or more hardware processors 104 receive the plurality transformed polarization states recorded by the polarization camera for the transparent object to be characterized when the polarized light of the plurality of known polarization states is incident onto the transparent object as depicted in FIG. 3.

At step 204, the polarization property computation module executed by the one or more hardware processors 104 estimates the plurality of Mueller Matrix image elements (typically the 16 Mueller Matrix image elements) by observing the change in the plurality of transformed polarization states while the polarized light propagates through the transparent object to form the Mueller Matrix. As understood by a person skilled in the art, Mueller matrix describes the linear relationship between the polarization states of incident light beam and the transformed light beam after passing through the transparent objects.

At step 206, the polarization property computation module executed by the one or more hardware processors 104 computes the plurality of polarization properties of the transparent object by decomposing the Mueller Matrix as product of three elementary matrices. Typically 16 Mueller Matrix image elements of the Mueller Matrix are decomposed into product of three elementary matrices based on standard Mueller Matrix decomposition using Lu-Chipman formalism. The decomposition generates fundamental polarization namely, a depolarizer ($M_\Delta$), a retarder ($M_R$), and a diattenuator ($M_D$), represented as $$M = M_\Delta M_R M_D \qquad (1)$$

Where M is the decomposed Mueller Matrix.

Further the plurality of polarization properties are extracted from the decomposed Mueller Matrix. The plurality of polarization properties includes, the diattenuation ($\delta$), the retardance (r), the depolarization ($\Delta$), the optical birefringence ($\Delta$N). The plurality of polarization properties are referred to as fundamental polarization properties.

At step 208, the optical property computation module executed by the one or more hardware processors 104 computes the plurality of optical properties that include the material attenuation index ($\mu_\alpha$) and the material refractive index (n). The material refractive index (n) is determined from a first element of the Mueller Matrix M(1,1) using Fresnel's law-based analysis, which represents a total intensity of the polarization light. The material refractive index (n) is calculated from total intensity M (1,1) element of the Mueller Matrix using the equation with refractive index of the external medium and air=1, the M (1,1) is the first element of the Mueller Matrix, which represents total intensity of the polarization light using the Fresnel's law-based analysis is given by:

$$M_{11} = \frac{(n-1)^2}{(n+1)^2} \qquad (2)$$

The material refractive index is calculated as follows:

$$\Rightarrow n = \frac{-2M_{11} \pm \sqrt{3M_{11}^2 + 2M_{11} - 1}}{2} \qquad (3)$$

Where n is the material refractive index.

The material attenuation index ($\mu_\alpha$) is calculated, by further processing the total intensity M (1,1) of the Mueller matrix by using the reverse Monte Carlo method. In the reverse Monte Carlo method, material attenuation coefficient (i.e., attenuation of light due to travelling through the sample material) is calculated from the reflectance, i.e., the total light intensity $M_{11}$.

The material refractive index and the material attenuation index are optical properties of the transparent object, which vary with changes in the transparent object properties caused due to several factors like manufacturing defect, aberration, inclusion of an impurity such as bubble or dust, thickness differences, and thereof. The material attenuation index is calculated using the reverse Monte Carlo algorithm. In this algorithm, there is a forward Monte Carlo model which is a statistical model that generates the profile of optical reflectance with the transparent object using an approximate attenuation coefficient value. The experimentally measured reference signal is provided, and the reflectance is compared, and the attenuation coefficient is optimized and adjusted.

At step 210, during inferencing stage, the Artificial Intelligence (AI) model executed by the one or more hardware processors 104 characterizes the transparent object. The characterizing of the transparent object is based on the computed plurality of polarization properties and the computed plurality of optical properties. The AI model is pre-trained with gold standard polarization properties and gold standard optical properties of transparent objects. The inference of the AI model on characterization of the transparent object is provided or displayed to an end user to decide upon quality/presence of defects of the material. The AI model can identify the deviations from the inferences, which includes, identifying manufacturing defect, aberration, inclusion of an impurity such as bubble or dust and thereof in the transparent objects.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for Mueller Matrix polarimetric characterization of transparent objects, the method comprising:

receiving, by one or more hardware processors, a plurality transformed polarization states for a transparent object to be characterized, wherein the plurality transformed polarization states are recorded by a polarization camera when a polarized light of a plurality of known polarization states is incident onto the transparent object;

estimating, by or more hardware processors, a plurality of Mueller Matrix image elements by observing a change in the plurality of transformed polarization states while the polarized light propagates through the transparent object to form a Mueller Matrix;

computing, by the one or more hardware processors, a plurality of polarization properties of the transparent object by decomposing the Mueller Matrix as product of three elementary matrices comprising, a depolarizer ($M_A$), a retarder ($M_R$), and a diattenuator ($M_D$), wherein the plurality of polarization properties comprising a diattenuation (δ), a retardance (r), a depolarization (Δ), and an optical birefringence (ΔN);

computing, by the one or more hardware processors, a plurality of optical properties, of the transparent object from the decomposed Mueller Matrix, wherein the plurality of the optical properties comprise a material refractive index (n) and a material attenuation index ($\mu_\alpha$), wherein the material refractive index (n) is determined from a first element of the Mueller Matrix M(1,1) using Fresnel's law-based analysis, which represents a total intensity of the polarized light, wherein the material refractive index (n) is calculated from the total intensity M (1,1) element of the Mueller Matrix with refractive index of an external medium and air=1, the M (1,1) is the first element of the Mueller Matrix, which represents total intensity of the polarization light using the Fresnel's law-based analysis is given by:

$$M_{11} = \frac{(n-1)^2}{(n+1)^2}$$

wherein the material refractive index is calculated as:

$$\Rightarrow n = \frac{-2M_{11} \pm \sqrt{3M_{11}^2 + 2M_{11} - 1}}{2}$$

where n is the material refractive index; and the material attenuation index ($\mu_\alpha$) is determined by processing the total intensity M (1,1) of the Mueller matrix by using a reverse Monte Carlo technique, wherein the material attenuation index reflecting presence of defect and refers to attenuation of light due to travelling through the transparent object is calculated from reflectance that is the total intensity $M_{11}$ of the Mueller matrix;

characterizing the transparent object, via an Artificial Intelligence (AI) model executed by the one or more hardware processors, during inferencing stage, wherein the characterizing of the transparent object is based on the computed plurality of polarization properties and the computed plurality of optical properties, and wherein to the AI model is pretrained with gold standard polarization properties and gold standard optical properties of transparent objects, wherein the inferences of the AI model on characterization of the transparent object is displayed to an end user to decide upon presence of defects of a material, wherein the characterization refers to identifying deviations of the transparent object from inferences, which the deviations include manufacturing defect, aberration, inclusion of an impurity as bubble or dust in the transparent objects.

2. The method of claim 1, wherein the material attenuation index ($\mu_\alpha$) is determined from the first element of the Mueller Matrix M(1,1) using the reverse Monte Carlo technique and comprises steps of a) forward Monte Carlo model derivation, b) reference experimental signal collection and c) the material attenuation index measurement and optimization.

3. A system, its method of use and its corresponding NTCRM, for Mueller Matrix polarimetric characterization of transparent objects, the system comprising: a memory storing instructions; one or more Input/Output (I/O) interfaces; and one or more hardware processors coupled to the memory via the one or more I/O interfaces, wherein the one or more hardware processors are configured by the instructions to: receive a plurality transformed polarization states for a transparent object to be characterized, wherein the plurality transformed polarization states are recorded by a polarization camera when a polarized light of a plurality of known polarization states is incident onto the transparent object; estimate a plurality of Mueller Matrix image elements by observing a change in the plurality of transformed polarization states while the polarized light propagates through the transparent object to form a Mueller Matrix; compute, a plurality of polarization properties of the transparent object by decomposing the Mueller Matrix as product of three elementary matrices comprising, a depolarizer ($M_\Delta$), a retarder ($M_R$), and a diattenuator ($M_D$), wherein the plurality of polarization properties comprising a diattenuation (δ), a retardance (r), a depolarization (Δ), and an optical birefringence (ΔN); compute a plurality of optical properties, of the transparent object from the decomposed Mueller Matrix, wherein the plurality of the optical properties comprise a material refractive index (n) and a material attenuation index ($\rho_\alpha$), wherein the material refractive index (n) is determined from a first element of the Mueller Matrix M(1,1) using Fresnel's law-based analysis, which represents a total intensity of the polarized light, wherein the material refractive index (n) is calculated from the total intensity M (1,1) element of the Mueller Matrix with refractive index of an external medium and air=1, the M (1,1) is the first element of the Mueller Matrix, which represents total intensity of the polarization light using the Fresnel's law-based analysis is given by:

$$M_{11} = \frac{(n-1)^2}{(n+1)^2}$$

wherein the material refractive index is calculated as:

$$M_{11} = \frac{(n-1)^2}{(n+1)^2}$$

where n is the material refractive index; and the material attenuation index ($\mu_\alpha$) is determined by processing the total intensity M (1,1) of the Mueller matrix by using a reverse Monte Carlo technique, wherein the material attenuation index reflecting presence of defect and refers to attenuation of light due to travelling through the transparent object is calculated from reflectance that is the total intensity $M$, of the Mueller matrix; characterize the transparent object via an Artificial Intelligence (AI) model executed by the one or more hardware processors, during inferencing stage, wherein the characterizing of the transparent object is based on the computed plurality of polarization properties and the computed plurality of optical properties, and wherein to the AI model is pretrained with gold standard polarization properties and gold standard optical properties of transparent objects, wherein the inferences of the AI model on characterization of the transparent object is displayed to an end user to decide upon presence of defects of a material, wherein the characterization refers to identifying deviations of the transparent object from inferences, which the deviations include manufacturing defect, aberration, inclusion of an impurity as bubble or dust in the transparent objects.

4. The system of claim 3, wherein the material attenuation index ($\mu_\alpha$) is determined from the first element of the Mueller Matrix M(1,1) using the reverse Monte Carlo technique and comprises steps of a) forward Monte Carlo model derivation, b) reference experimental signal collection and c) the material attenuation index measurement and optimization.

5. One or more non-transitory machine-readable information storage mediums comprising one or more instructions which when executed by one or more hardware processors cause:
 receiving, by one or more hardware processors, a plurality transformed polarization states for a transparent object to be characterized, wherein the plurality transformed polarization states are recorded by a polarization camera when a polarized light of a plurality of known polarization states is incident onto the transparent object;
 estimating, by or more hardware processors, a plurality of Mueller Matrix image elements by observing a change in the plurality of transformed polarization states while the polarized light propagates through the transparent object to form a Mueller Matrix;
 computing, by the one or more hardware processors, a plurality of polarization properties of the transparent object by decomposing the Mueller Matrix as product of three elementary matrices comprising, a depolarizer ($M_\Delta$), a retarder ($M_R$), and a diattenuator ($M_D$), wherein the plurality of polarization properties comprising a diattenuation ($\delta$), a retardance (r), a depolarization ($\Delta$), and an optical birefringence ($\Delta N$);
 computing, by the one or more hardware processors, a plurality of optical properties, of the transparent object from the decomposed Mueller Matrix, wherein the plurality of the optical properties comprise a material refractive index (n) and a material attenuation index ($\mu_\alpha$), wherein
  the material refractive index (n) is determined from a first element of the Mueller Matrix M(1,1) using Fresnel's law-based analysis, which represents a total intensity of the polarized light, wherein the material refractive index (n) is calculated from the total intensity M (1,1) element of the Mueller Matrix with refractive index of an external medium and air=1, the M (1,1) is the first element of the Mueller Matrix, which represents total intensity of the polarization light using the Fresnel's law-based analysis is given by:

$$M_{11} = \frac{(n-1)^2}{(n+1)^2}$$

wherein the material refractive index is calculated as:

$$\Rightarrow n = \frac{-2M_{11} \pm \sqrt{3M_{11}^2 + 2M_{11} - 1}}{2}$$

where n is the material refractive index; and
 the material attenuation index ($\mu_\alpha$) is determined by processing the by using a reverse Monte Carlo technique, wherein the material attenuation index reflecting presence of defect and refers to attenuation of light due to travelling through the transparent object is calculated from reflectance that is the total intensity $M_{11}$ of the Mueller matrix;
 characterizing the transparent object, via an Artificial Intelligence (AI) model executed by the one or more hardware processors, during inferencing stage, wherein the characterizing of the transparent object is based on the computed plurality of polarization properties and the computed plurality of optical properties, and wherein to the AI model is pretrained with gold standard polarization properties and gold standard optical properties of transparent objects, wherein the inferences of the AI model on characterization of the transparent object is displayed to an end user to decide upon presence of defects of a material,
 wherein the characterization refers to identifying deviations of the transparent object from inferences, which the deviations include manufacturing defect, aberration, inclusion of an impurity as bubble or dust in the transparent objects.

6. The one or more non-transitory machine-readable information storage mediums of claim 5, wherein the material attenuation index ($\mu_\alpha$) is determined from the first element of the Mueller Matrix M(1,1) using the reverse Monte Carlo technique and comprises steps of a) forward Monte Carlo model derivation, b) reference experimental signal collection and c) the material attenuation index measurement and optimization.

* * * * *